Nov. 14, 1950  F. E. ALTMAN ET AL  2,529,894
OBJECTIVE MOUNT
Filed May 28, 1948  2 Sheets-Sheet 1

FRED E. ALTMAN
JOSEPH A. BLASH
INVENTORS

BY *Newton M. Perzius*
*J. Griffin Little*
ATTORNEYS

Nov. 14, 1950     F. E. ALTMAN ET AL     2,529,894
OBJECTIVE MOUNT
Filed May 28, 1948     2 Sheets-Sheet 2

FRED E. ALTMAN
JOSEPH A. BLASH
INVENTORS

Patented Nov. 14, 1950

2,529,894

UNITED STATES PATENT OFFICE 2,529,894

OBJECTIVE MOUNT

Fred E. Altman and Joseph A. Blash, Rochester, N. Y., assignors to Eastman Kodak Company, Rochester, N. Y., a corporation of New Jersey Application May 28, 1948, Serial No. 29,798

14 Claims. (Cl. 88—57)

1

The present invention relates to photography, and more particularly to a mount for an optical objective.

The mount of the present invention is primarily, although not necessarily, intended for use with the lens structure shown and described in the co-pending application of Altman, No. 29,799, filed May 28, 1948, now Patent No. 2,494,025, dated January 10, 1950. This Altman application shows a photographic objective comprising two plano-concave lens elements with the plano sides facing each other, aligned and spaced between two cemented doublets. The facing plano sides thus provide an air space of zero power therebetween. In order to vary the magnification, the lenses are moved axially as a whole. However, in order to maintain a flat image field at different magnifications, it is necessary to change the zero air space, and this change must be in proper relation to the magnification, all of which is fully described in the Altman application, to which reference may be had for a more detailed discussion.

The mount of the present invention is designed to accomplish such movements so as to insure automatically a flat field at any selected magnification. In order to compensate for optical errors in the various elements, the latter are initially positioned in the mount, and thereafter the elements are held against rotation so that all adjustments are secured by axial movement only, thus eliminating centering errors and providing a more accurate system. This arrangement gives the same advantage as a fixed lens in that there is no relative rotation of the lens elements so that there is no change of astigmatism, the advantages of which are deemed apparent to those skilled in the art.

To secure the necessary adjustments, a mechanism is provided to move all the elements axially as a unit to obtain the desired magnification; and, simultaneously therewith, a relative axial movement is imparted to certain of the lens elements so as to change the thickness of the zero air space. By means of such adjustments, a flat image field is assured at all magnifications. Furthermore, all adjustments are obtained by axial movement only so that the various optical errors are eliminated. Also, the lens elements are maintained in proper alignment by means of sleeve fits with the lens barrel.

The present invention has, therefore, as its principal object, the provision of an objective mount which adjusts the lens elements so as to maintain a flat image field at different magnifications.

Another object of the invention is the provision of a mount mechanism which secures the desired adjustments without necessitating rotation of any of the lens elements.

Yet another object of the invention is the provision of a lens mount in which sleeve fits of the lens cells are combined with differential threads to assure accurate alignment of the lens elements and to provide the necessary focusing adjustment while maintaining a flat image field.

To these and other ends, the invention resides in certain improvements and combinations of parts, all as will be hereinafter more fully described, the novel features being pointed out in the claims at the end of the specification.

In the drawings.

Similar reference numerals throughout the various views indicate the same parts.

Figure 1:
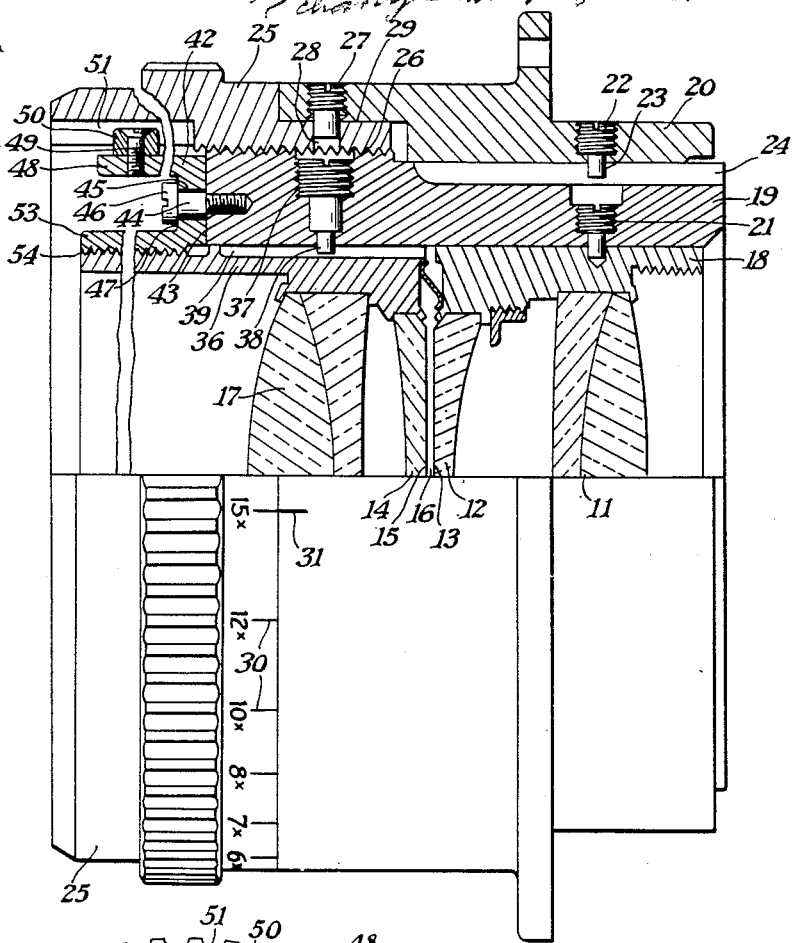
Fig. 1 is a partial longitudinal sectional view through an objective mount constructed in accordance with the present invention, showing the relation of the various parts.

The mount of the present invention is primarily, although not necessarily, designed and intended for use with the lens structure shown and described in the above-mentioned co-pending application to Altman. As this lens structure does not form a part of the present invention, data relative thereto will not be given, and only so much of the structure as is necessary to a complete understanding of the present invention will be illustrated and discussed.

The Altman lens system comprises a rear cemented doublet 11, in front of which is positioned a plano-concave lens 12 having a front flat or plano surface 13. A front plano-concave lens 14 is provided with a rear plano surface 15 which faces the plano surface 13 and is spaced therefrom by an air space 16 of zero power, as is apparent from an inspection of Figs. 1, 3 and 5. A front cemented doublet 17 is positioned ahead of the lens 14. Thus, the lens system is made up of four components 11, 12, 14 and 17, separated by air spaces, the second space 16 of which is of zero power, as is apparent. In order to secure the desired magnification all the lens elements are moved axially but without rotation. Simultaneously with the focusing adjustment, the front doublet 17 and the lens 14 are moved axially but non-rotatably as a unit relative to the lenses 11 and 12 to alter or change the thickness of the zero air space 16 to insure the necessary field flatness. In order that such field flatness will be obtained, it is imperative that the change in the zero air space must be in proper relation to the focusing adjustment.

In the mount construction of the present invention, the rear lens elements 11 and 12 are mounted in a single lens cells 18, designated as a rear cell, which is positioned in and supported in an axially movable lens barrel 19 which is slidable in a fixed outer sleeve 20. The cell 18 and barrel 19 may be formed integral; but, for manufacturing reasons, they are preferably made separate, and, after adjustment, are connected together by a pin or set screw 21 to form an integral structure. Thus the cell 18 and barrel 19 will move as a unit, and the lens cell will form a sleeve fit with the barrel so as to assure proper alignment of the cell. In order to retain these parts against rotation, the sleeve 20 is provided with a screw 22 formed with a depending portion 23 which is positioned in an axial slot 24 formed on the barrel 19. This pin-and-slot connection permits free axial movement of the barrel 19 and cell 18, but prevents rotation thereof relative to the sleeve 20, as is apparent.

A focusing ring 25 is rotatably mounted on the sleeve 20 and is connected to the barrel 19 by reason of a thread 26. Thus, upon rotation of the ring 25, an axial movement will be imparted to the barrel 19 and the cell 18 to adjust the elements 11 and 12 axially. In order to retain the ring 25 against axial movement, the sleeve 20 is provided with a screw 27 which extends into a peripheral slot 28 formed on the surface 29 of the ring 25. Thus, the ring 25 may rotate on the sleeve, but cannot move axially relative thereto. The barrel 19 and the cell 18, on the other hand, may move axially but cannot rotate. As the mount of the present invention is primarily designed for use with the Altman lens system which, in turn, is intended for use in microfile copying of printed matter in a greatly reduced size, the ring 25 is provided with a magnification scale 30 which cooperates with a fixed index mark 31 on the outer surface of the sleeve 20, as shown in Fig. 1.

The front lens elements 14 and 17 are mounted in a front lens cell 36 which is supported in and forms a sleeve fit with the front end of the lens barrel 19 and moves axially therewith upon rotation of the ring 25, as will be later explained. The sleeve fit serves to align the front lens cell with the rear lens cell to maintain lens alignment, the advantages of which are obvious. As none of the lens elements are rotated, means is provided to hold the cell 36 against rotation. To secure this result, the barrel 19 is provided with a screw 37, the lower end 38 of which extends into an axial slot 39 formed on the outer periphery of the cell 36. This pin-and-slot connection effectively prevents rotation of the cell 36, yet permits axial movement thereof relative to the barrel 19, in a manner and for a reason to be later described.

Thus, both cells 18 and 36 are supported in the lens barrel 19 so that axial movements of the latter will move all the elements as a unit to secure the desired magnification adjustment. In the initial factory adjustment, the lens cells 18 and 36 are positioned axially for a definite magnification, and, if necessary, the cells may be rotated relative to the barrel to reduce any aberrations to a minimum. Thereafter, the cells are pinned to the barrel by means of screws 21 and 37 to hold the cells and barrel against relative rotation. The parts are now adjusted for one magnification and a flat image field is provided at that magnification. In order to adjust the mount for a different magnification, the cells may be moved axially as a unit. However, it has been found that while such unitary movement will give the desired magnification, a flat image field will not be secured. Such field flatness may, however, be obtained by varying the thickness of the zero air space, such variation being in accordance with the magnification adjustment. Of course, this variation in the zero air space may be secured by a separate operation, but it is preferred to provide a mechanism by which the zero air space is adjusted automatically during the focusing operation, and the variation in the air space is properly coordinated with the focusing so as to secure a flat field at the particular magnification for which the focusing ring has been adjusted. The result is that all the operator has to do is adjust the focusing ring 25 to the desired magnification, which adjustment serves automatically to impart the relative axial movement to the lens cells to secure the necessary variation in the zero air space to insure proper field flatness.

Figure 3:
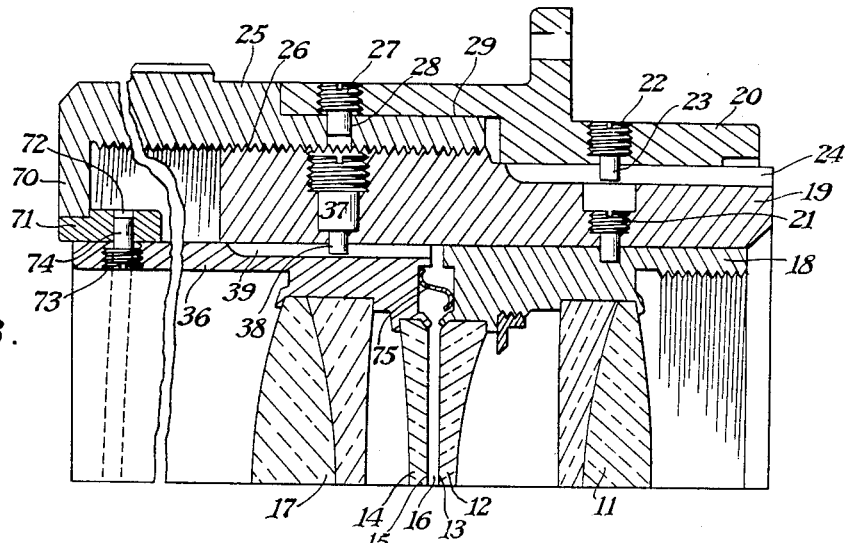
Fig. 3 is a partial longitudinal sectional view through a modified mount construction.
Figures 4, 5:
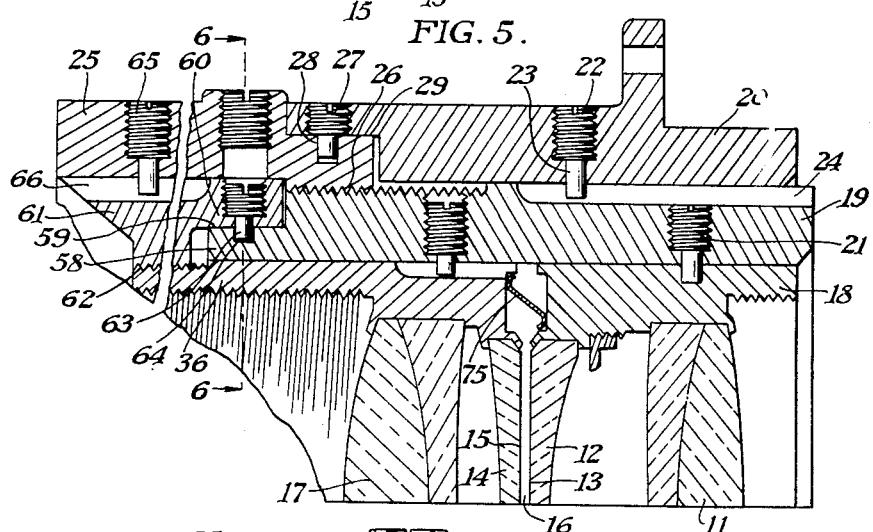
Fig. 4 is a side view of the adjusting ring for the front lens element of Fig. 3, showing the adjusting slot.
Fig. 5 is a view similar to Fig. 3 showing still another form of mount constructed in accordance with the present invention.

In the embodiment shown in Figs. 1 and 5, the means for imparting a relative axial movement to the lens cell is carried by and is movable axially as a unit with the lens barrel 19. In the embodiment shown in Fig. 3 on the other hand, the means is separate from the lens barrel and comprises a direct connection between the focusing ring and the front lens cell.

Figure 2:
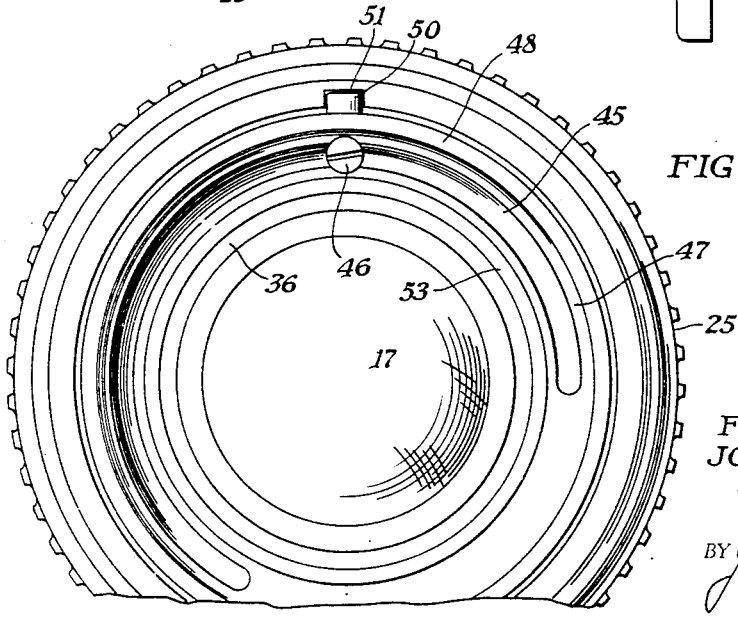
Fig. 2 is a front view of the mount illustrated in Fig. 1, showing the pin-and-slot connection for the front mount adjusting sleeve.

In the structures shown in Figs. 1 and 2, an annular member 42, U-shaped in cross section, is mounted on the front end 43 of the lens barrel 19 and is connected thereto by a screw 44, secured to the barrel and extending through an arcuate slot 45 formed in the member 42. An enlarged head 46 on the screw engages the outer surface 47 of the member 42 and holds the latter against the front end 43 of the barrel, as best shown in Fig. 3. The member 42 is formed with an outer annular flange 48 to which is secured, by a screw 49, a radial lug 50 which extends into an axial slot 51 formed on the inner surface of the focusing ring 25 to connect the member 42 to the ring for unitary rotation therewith, as is apparent. The member 42 is also formed with an inner axially extending annular flange 53 which is connected by a thread 54 to the front lens cell 36 to connect the latter in operative relation to the ring 25.

The thread 54 is a faster thread than thread 26. The result is that when the ring 25 is rotated, the thread 26 will impart an axial movement to the lens barrel 19. However, as both lens cells are mounted in and supported by the barrel, both cells will move as a unit with the barrel to secure the necessary magnification adjustment. As the member 42 is also secured to the barrel 19, it moves as a unit therewith. However, due to the pin-and-slot connections 50 and 51, the rotation of the ring 25 will cause the member 42 to rotate on the barrel 19. Such rotation will cause the thread 54 to impart a further axial movement to the cell 36 to move the cells 36 and 18 relatively axially to vary the zero air space. Thus, the rotation of the focusing ring 25 serves to move both cells axially for focusing; and, in addition, simultaneously impart a relative axial movement to the cells to vary the zero air space 16. With the particular lens structure used, it has been found that the necessary relative axial movement to the cells is secured by making thread 54 one hundred and one (within 101) times as fast as the thread 26. Obviously, if other lens designs are used, different thread differentials must be employed. However, the threads must be such as to move both cells axially for focusing to secure the desired magnification, and simultaneously shift the cells relatively to each other the proper amount to vary the zero air space in accordance with the magnification adjustment so as to secure the desired flat field at all magnifications.

Figure 6:
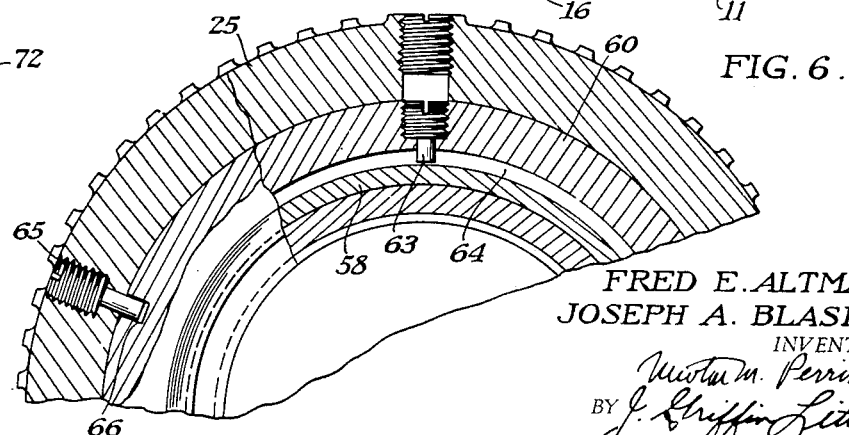
Fig. 6 is a vertical sectional view through the mount shown in Fig. 5 and taken substantially on line 6—6 thereof, showing the relation of the pin-and-slot connection between the various parts for adjusting the front lens cell.

In the embodiment shown in Figs. 5 and 6, the front end of the lens barrel 19 is formed with an axially extending annular flange 58, the outer surface 59 of which supports a rearwardly projecting flange 60 of an adjusting member 61. The latter is connected by a thread 62 to the front cell 36. In this embodiment, the threads 26 and 62 have the same relation as those described in connection with Figs. 1 and 2 so as to move both cells axially; and, in addition, impart a relative axial movement to vary the zero air space. In order to secure the necessary adjustment, it is necessary that the member 62 move as a unit with the barrel 19, but in addition, the member 62 must rotate relative to the barrel in a manner similar to the member 42 above described. To secure this result, the flange 58 of the member 61 has threaded thereinto a screw 63 which projects into a registering peripheral slot 64 formed on the surface 59. This pin-and-slot connection permits free rotation of the member 61 on the barrel 19 but prevents relative axial movement therebetween. In order to impart the necessary rotation to the member 61, the focusing ring is provided with a screw 65 which extends into an axially extending slot 66 formed on the outer surface of the member 61 to key the latter to the focusing ring 25 for unitary rotation therewith, the pin-and-slot connection permitting the necessary relative axial movement between the ring and the member 61.

Thus, when the ring 25 is rotated, the thread 26 will impart an axial movement to the lens barrel 19 as well as both lens cells 18 and 36. During this axial movement, the member 61 moves as a unit with the barrel by reason of the pin-and-slot connections 63 and 64. However, as the member 61 is in turn connected to the ring 25 by the pin-and-slot connections 65 and 66, the member 61 will rotate on the barrel and as a unit with the focusing ring. Rotation of member 61 is transmitted through the thread 62 to shift the front lens cell 36 axially relative to the rear cell 18 to vary the zero air space 16. Thus, focusing and adjustment of the air space are secured in one operation to insure the desired flatness of field at different magnifications. The pin-and-slot connections 65 and 66 may be in axial alignment with the screw 63, as shown in Fig. 5. Such an arrangement may, however, tend to weaken the parts. Therefore, it is preferred to offset the screw 65 from the screw 63, as shown in Fig. 6.

Thus, in the embodiment shown in Figs. 1 and 2, and Figs. 5 and 6, the members 42 and 61 for imparting a relative axial movement to the front lens cell 36 are mounted on and move as a unit with the lens barrel 19 during the focusing operation. However, as these members are also connected to the focusing ring 25, the latter will impart simultaneously a rotating movement to the members and this movement serves to shift the cells relatively to vary the zero air space 16 in proper relation and amount relative to the focusing adjustment. Thus, both operations are secured simultaneously upon the rotation of the focusing ring.

In the structure shown in Figs. 3 and 4, the member for imparting the relative axial movement to the front cell is not mounted on the lens barrel; but, on the contrary, forms a part of the focusing ring 25. Therefore, the front of the latter is formed with a down-turn flange 70, the end of which terminates in a rearwardly extending annular flange 71 formed with a peripheral slot 72 which extends slightly in an axial direction. The front end of the front lens cell 36 has secured thereto a screw 73 having a radially projecting portion 74 which extends into the slot 72. This pin-and-slot connection provides, in effect, a single threaded connection between the focusing ring 25 and the front lens cell 36 so that these members may be considered broadly as threadibly connected. The pitch of the slot 72 is such that the rotation of the ring 25 to shift the barrel 19 and rear cell 18 axially will serve to impart sufficient axial movement to position the front cell 36 with relation to the rear cell to secure the desired focus, and also to shift the front cell relative to the rear cell to vary the zero air space 16 to secure the desired field flatness for the particular magnification for which the ring has been adjusted. Here again the adjustment of the focusing ring imparts enough axial movement to focus the lenses for the desired magnification, and so provide the necessary relative movement to provide a flat image field.

In other respects the structures of Figs. 3 and 4 are identical to those in Figs. 1 and 5. The flange 71 may form an integral part of the flange 70, but for manufacturing and assembling reasons, these parts are formed esparately and then suitably connected together. Therefore, the flange 71 may be considered broadly as an integral part of the focusing ring which is connected to the front lens cell 36 by the pin-and-slot connections 72 and 74. Also, the pitch of the slot 72 has the same relation to the thread 26 as the threads 54 and 62 above described. In order to take up any possible back-lash in the threaded connections, a flexible washer or spring 75 is interposed between the two lens cells.

In all the embodiments the front and rear lens cells are connected to the focusing ring by means of differential threads, the respective pitches of which are such that upon rotation of the focusing ring both cells are moved as a whole for focusing to secure the desired magnifications; and, in addition, and simultaneously a relative axial movement is imparted to the cells to vary the zero air space in accordance with and in relation to the magnification to maintain the image field flat for all magnifications.

While the mount of the present invention has been shown and described in connection with the four-component lens structure covered by the above-mentioned Altman application, it is to be understood and it is obvious that a mount constructed in accordance with the present invention may be used with a wide range of other lens structures. Obviously, with such other lens structures the relative pitches of the various threads will have to be altered to secure the desired movement of the lens barrel and the front lens cell.

The present invention thus provides a lens mount construction which will adjust the lens elements automatically to maintain a flat field at different magnifications. Also, these adjustments are secured merely by moving the lens elements axially but without rotation, thus eliminating the introduction of centering and other errors which may result from a lens rotation. Furthermore, the sliding relation of the lens cells further maintains proper lens alignment.

While certain embodiments of the invention have been disclosed, it is to be understood that the inventive idea may be carried out in a number of ways. This application is, therefore, not to be limited to the precise details disclosed, but is intended to cover all variations and modifications thereof falling within the scope of the appended claims.

What we claim and desire to secure by Letters Patent of the United States is:

1. An optical objective comprising at least four components separated by air spaces, one of said air spaces having zero power, means for focusing the objective as a whole to vary the magnification, means for varying the air space of zero power, and means for coordinating the change in air space of zero power with the change in magnification to maintain a flat image field at different magnifications.

2. An objective according to claim 1 consisting of two air spaced plano-concave elements between two positive elements, the air space between the two plano-concave elements having zero power.

3. An optical objective comprising at least four components separated by air spaces, one of said air spaces having zero power, means for mounting said components for axial movement only, means to move all of said components axially for focusing to vary the magnification, means for varying the air space of zero power, and means for coordinating the change in air space of zero power with the change in magnification to maintain a flat image field at different magnifications.

4. An optical objective comprising at least four components separated by air spaces, one of said air spaces having zero power, means to move all of said components axially but without rotation to focus the objective as a whole to vary the magnifications, means operative simultaneously with the focusing means to move the two components enclosing an air space of zero power relatively axially to vary the air space of zero power, and means for coordinating the change in air space with the change in magnification to maintain a flat image field at different magnifications.

5. An optical objective comprising at least four components two of which are separated by an air space of zero power, means for mounting all of said components for non-rotatable axial movement, means for moving all of said components axially for focusing to vary the magnification, means operative simultaneously with the focusing means to move said two components axially relatively to vary said air space of zero power, and means for coordinating the change in air space of zero power with the change in magnification to maintain a flat image field at different magnification.

6. An optical objective comprising at least four components the central two of which consist of plano-concave elements separated by an air space of zero power, means for mounting all of said components for non-rotatable axial movement, means for moving all of said components axially as a whole to vary the magnification, means operative simultaneously with said moving means to shift said two components axially relative to vary said air space of zero power, and means for coordinating the change in air space with the change in magnification to maintain a flat image field at different magnifications.

7. An optical objective comprising an axially movable but non-rotatable lens barrel, at least four lens components separated by air spaces one of which is of zero power, at least one of said components being mounted and axially movable as a unit with said barrel, means for moving said barrel and all of said components axially to vary the magnification, means for relatively moving the two components enclosing an air space of zero power to vary said air space of zero power, and means for coordinating the change in the air space of zero power with the change in magnification to maintain a flat image field at different magnifications.

8. An optical objective comprising a fixed sleeve, a lens barrel slidably mounted for axial movement in said sleeve, means for retaining said barrel against rotation relative to said sleeve, a pair of lens cells carried by said barrel so as to move axially as a unit therewith, lens elements carried by said cells, the adjacent elements of said cells being separated by an air space of zero power, means for moving of said barrel and components axially to vary the magnification, and rotatable means carried by said barrel and connected to one of said lens cells to move the latter axially relative to said barrel to change said air space in accordance with the magnification to maintain a flat image field at different magnifications.

9. An optical objective comprising a fixed sleeve, a lens barrel slidably mounted for axial movement in said sleeve, means for retaining said barrel against rotation relative to said sleeve, a pair of lens cells carried by said barrel so as to move axially as a unit therewith, lens elements carried by said cells, the adjacent elements of said cells being separated by an air space of zero power, a rotatable focusing ring carried by said sleeve, a threaded connection between said barrel and said ring so that rotation of the latter will move said barrel and components axially to vary the magnification, a member rotatably mounted on said barrel and keyed to said ring to rotate therewith, and a threaded connection between said member and one of said cells for moving the latter axially relative to said other cell to change said air space in accordance with the change in magnification to maintain a flat image field at different magnifications.

10. An optical objective comprising a fixed sleeve, a lens barrel slidably mounted for axial movement in said sleeve, means for retaining said barrel against rotation relative to said sleeve, a lens cell fixed to said barrel, a second cell keyed to said barrel for non-rotatable axially movement relative thereto, lens elements carried by each cell, the adjacent elements of the cells being separated by an air space of zero power, a focusing ring rotatably mounted on said sleeve, a threaded connection of one pitch connecting said barrel to said ring so that said barrel and cells may be moved axially as a unit to vary the magnification, a member rotatably mounted on said barrel and keyed to said ring so that rotation of the latter will rotate said member on said barrel, and a threaded connection of a different pitch connecting said member to one of said cells to move the latter axially relative to said barrel but without rotation to move said cells relatively to vary said zero air space in accordance with the magnification adjustment to maintain a flat image field at different magnifications.

11. An optical objective comprising a fixed sleeve, a lens barrel slidably mounted for axial movement in said sleeve, means for retaining said barrel against rotation relative to said sleeve, a rear lens cell fixedly secured to said barrel, lens elements carried by said cell, the front element of said cell having a plano front surface, a front lens call slidably mounted on said barrel for axial movement relative thereto, lens elements carried by said front cell and comprising a rear element having a rear plano surface facing and spaced from said first plano surface by an air space of zero power, a focusing ring rotatably mounted on said sleeve, a threaded connection of one pitch between said ring and barrel to move the barrel and both cells axially as a unit without rotation to vary the magnification, a member rotatably mounted on said barrel, means for connecting said member to said ring for rotation therewith but for axial movement relative thereto as a unit with said barrel, and a threaded connection of a different pitch connecting said member and said front cell so that rotation of said ring will non-rotatably shift said front cell axially relative to said rear cell to vary the air space of zero power in accordance with the change in magnification to maintain a flat image field at different magnifications.

12. An optical objective comprising a fixed sleeve, a lens barrel slidably mounted for axial movement in said sleeve, means for retaining said barrel against rotation relative to said sleeve, a rear lens cell carried by said barrel and non-rotatably movable axially as a unit therewith, means for sliding said barrel axially in said sleeve, a front lens cell, means for connecting said front cell to said barrel for non-rotatable relative axial movement, each of said cells having positioned therein an element with a plano surface, said plano surfaces facing each other and being spaced to provide an air space of zero power, and means for operatively connecting said front cell to said sliding means so that the actuating of the latter will move both lenses axially to vary the magnification and simultaneously non-rotatably slide said front cell relative to said barrel to vary said zero air space to maintain a flat image field at different magnifications.

13. An optical objective comprising a fixed sleeve, a lens barrel slidably mounted for axial movement in said sleeve, means for retaining said barrel against rotation relative to said sleeve, a rear lens cell carried by said and non-rotatably movable axially as a unit therewith, a focusing ring rotatably mounted on said sleeve, means for connecting said barrel to said ring so that rotation of the latter will move said barrel axially, a front lens cell carried by said barrel, means for connecting said front lens cell for sliding non-rotatable movement in said barrel, each of said cells having positioned therein lens elements, one of which has a plano surface which faces but is spaced axially from a similar surface in the other cell to provide an air space of zero power, and means for connecting said front cell to said ring so that rotation of said ring will shift said barrel and rear cell axially to vary the magnification and will move simultaneously said front cell axially relative to the rear cell to adjust said zero air space to maintain a flat image field at different magnifications.

14. An optical objective comprising a fixed sleeve, a lens barrel slidably mounted for axial movement in said sleeve, means for retaining said barrel against rotation relative to said sleeve, a rear lens cell carried by said barrel and non-rotatably movable axially as a unit therewith, a focusing ring rotatably mounted on said sleeve, means for connecting said barrel to said ring so that rotation of the latter will move said barrel axially, a front lens cell carried by said barrel, means for connecting said front lens cell for sliding non-rotatable movement in said barrel, each of said cells having positioned therein lens elements, one of which has a plano surface which faces but is spaced axially from a similar surface in the other mount to provide an air space of zero power, said ring being formed with a peripheral axially inclined slot, and a radially projecting pin carried by said front cell and extending into said slot to connect said front cell to said ring whereby the rotation of said ring will move said front mount axially to cooperate with said rear mount to vary the magnification and simultaneously move said front cell axially relative to said rear cell to vary said zero air space to maintain a flat image field at different magnifications.

FRED E. ALTMAN.
JOSEPH A. BLASH.

REFERENCES CITED

The following references are of record in the file of this patent:

UNITED STATES PATENTS

| Number | Name | Date |
|---|---|---|
| 461,609 | Gundlach | Oct. 20, 1891 |
| 1,394,078 | Frederick | Oct. 18, 1921 |
| 1,463,132 | Graf | July 24, 1923 |
| 1,565,205 | Rudolph | Dec. 8, 1925 |
| 1,937,168 | Repp | Nov. 28, 1933 |
| 2,143,813 | Wood | Jan. 10, 1939 |
| 2,279,476 | Mihalyi | Apr. 14, 1942 |

Certificate of Correction

Patent No. 2,529,894 November 14, 1950

FRED E. ALTMAN ET AL.

It is hereby certified that error appears in the printed specification of the above numbered patent requiring correction as follows:

Column 10, line 4, after the word "said" insert *barrel*;

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*